United States Patent
Toth et al.

(10) Patent No.: US 12,497,345 B2
(45) Date of Patent: Dec. 16, 2025

(54) METHOD FOR EXTRACTING ALCOHOLS FROM AN INITIAL MIXTURE COMPRISING ALCOHOLS IN AQUEOUS PHASE

(71) Applicant: IFP Energies nouvelles, Rueil-Malmaison (FR)

(72) Inventors: Eszter Toth, Rueil-Malmaison (FR); Helene Velly, Rueil-Malmaison (FR); Nicolas Lopes Ferreira, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 165 days.

(21) Appl. No.: 18/283,305

(22) PCT Filed: Mar. 9, 2022

(86) PCT No.: PCT/EP2022/055967
§ 371 (c)(1),
(2) Date: Sep. 21, 2023

(87) PCT Pub. No.: WO2022/200039
PCT Pub. Date: Sep. 29, 2022

(65) Prior Publication Data
US 2024/0174587 A1    May 30, 2024

(30) Foreign Application Priority Data
Mar. 22, 2021 (FR) .................................. 2102845

(51) Int. Cl.
*B01D 3/14* (2006.01)
*B01D 3/00* (2006.01)
(Continued)

(52) U.S. Cl.
CPC .............. *C07C 29/82* (2013.01); *B01D 3/002* (2013.01); *B01D 3/007* (2013.01); *B01D 3/143* (2013.01); *B01D 3/36* (2013.01)

(58) Field of Classification Search
CPC ........ B01D 3/002; B01D 3/007; B01D 3/143; B01D 3/36; C07C 29/82
See application file for complete search history.

(56) References Cited

U.S. PATENT DOCUMENTS

| | | | | |
|---|---|---|---|---|
| 4,309,254 | A | * | 1/1982 | Dahlstrom ............. B01D 3/001 203/25 |
| 4,428,798 | A | * | 1/1984 | Zudkevitch ........ B01D 11/0426 568/918 |

(Continued)

FOREIGN PATENT DOCUMENTS

FR    3053357 A1    1/2018

OTHER PUBLICATIONS

International Search Report PCT/EP2022/055967 dated Jun. 15, 2022 (pp. 1-2).

*Primary Examiner* — Jonathan Miller
(74) *Attorney, Agent, or Firm* — Millen, White, Zelano & Branigan, P.C; Brion P. Heaney

(57) ABSTRACT

The invention relates to a process for extracting alcohols from an initial mixture (1) comprising alcohols in aqueous phase, with:
a distillative separation by an isopropanol-butanol distillation column (III) equipped at the top with a condenser (c3), intended for separating said mixture into a water-isopropanol azeotrope stream (6) at the top and into a water-butanol azeotrope stream (7) at the bottom,
a distillative separation intended for separating the water-butanol azeotrope stream into water and butanol, by a hetero-azeotropic distillation system comprising at least one water-recovering water column (IV) and at (Continued)

least one butanol (9)-recovering butanol column (V) equipped with a reboiler (r5),
such that a heat transfer is performed from the top water-isopropanol azeotrope stream (6) entering the condenser of the isopropanol-butanol distillation column (III), to the stream entering the reboiler of the butanol column (V).

23 Claims, 1 Drawing Sheet

(51) Int. Cl.
  *B01D 3/36* (2006.01)
  *C07C 29/82* (2006.01)

(56) References Cited

U.S. PATENT DOCUMENTS

| | | | | |
|---|---|---|---|---|
| 4,636,284 A * | 1/1987 | English | ............... | B01D 3/40 203/84 |
| 5,124,004 A * | 6/1992 | Grethlein | ............... | B01D 3/007 203/50 |
| 5,294,304 A * | 3/1994 | Kano | ............... | C07C 29/84 568/918 |
| 5,332,478 A * | 7/1994 | Berg | ............... | C07C 29/82 203/58 |
| 7,297,236 B1 * | 11/2007 | Vander Griend | ............... | B01D 3/005 202/205 |
| 8,101,808 B2 * | 1/2012 | Evanko | ............... | C07C 29/86 568/916 |
| 9,732,362 B2 * | 8/2017 | Barr | ............... | C12P 7/16 |
| 9,770,674 B2 * | 9/2017 | Lee | ............... | C07C 7/005 |
| 9,962,623 B2 * | 5/2018 | Zaher | ............... | B01D 3/002 |
| 10,022,648 B2 * | 7/2018 | Maedebach | ............... | B01D 3/007 |
| 10,039,997 B2 * | 8/2018 | Filippi | ............... | B01D 3/002 |
| 10,464,867 B2 * | 11/2019 | Lee | ............... | B01D 3/42 |
| 10,961,489 B2 * | 3/2021 | Coupard | ............... | B01D 3/002 |
| 2009/0171129 A1 * | 7/2009 | Evanko | ............... | C07C 29/80 568/916 |
| 2014/0235901 A1 * | 8/2014 | Gadewar | ............... | B01J 8/0457 568/918 |
| 2015/0152032 A1 * | 6/2015 | Aird | ............... | B01D 3/10 203/77 |
| 2015/0224420 A1 * | 8/2015 | Hickey | ............... | B01D 3/143 203/41 |
| 2016/0082363 A1 * | 3/2016 | Lee | ............... | B01D 3/322 202/161 |
| 2017/0320796 A1 * | 11/2017 | Lee | ............... | B01D 3/32 |
| 2019/0203162 A1 * | 7/2019 | Coupard | ............... | C12P 7/10 |
| 2024/0174587 A1 * | 5/2024 | Toth | ............... | C07C 45/82 |

* cited by examiner

METHOD FOR EXTRACTING ALCOHOLS FROM AN INITIAL MIXTURE COMPRISING ALCOHOLS IN AQUEOUS PHASE

TECHNICAL FIELD

The present invention relates to a process for extracting, especially, alcohols from a mixture comprising these alcohols in aqueous phase. It may be applied to the recovery of alcohols as products from a must obtained at the end of the fermentation of an aqueous solution of C5 and/or C6 sugars, as is known from fermentation processes referred to as IBE (Isopropanol/Butanol/Ethanol) or IBEA (Isopropanol/Butanol/Ethanol/Acetone) processes and carried out by "solvent-producing" *Clostridium* strains. A fermentation must refers to an aqueous medium in which fermentation has taken place. C5 and/or C6 sugars refer to saccharides possessing 5 or 6 carbons. The invention is directed more specifically to extracting isopropanol and butanol as majority compounds of potential economic value.

PRIOR ART

In order to meet the challenges of the energy transition, a lot of research is being conducted to develop "green" processes, affording access to chemical intermediates as an alternative to the refining of petroleum and/or to petrochemistry.

Alcohols obtained from fermentation processes (for example, isopropanol and n-butanol) are among the most promising replacements for petrochemical derivatives. ABE (Acetone-Butanol-Ethanol) fermentation, carried out by microorganisms belonging to the genus *Clostridium*, is one of the oldest fermentations to have been industrialized, and has since been extensively studied. More recently, IBE (Isopropanol-Butanol-Ethanol) fermentation, which produces a mixture of isopropanol, butanol and ethanol and is likewise carried out by microorganisms belonging to the genus *Clostridium*, has been the subject of fairly recent studies (Dos Santos Vieira et al Bioresour Technol; 2019 287:121425 doi: 10.1016/j.biortech 2019.121425 Acetone-free biobutanol production: Past and recent advances in the Isopropanol-Butanol-Ethanol (IBE) fermentation).

As regards the fermentation procedure employed in this type of process, production in batch mode has been studied for ABE and IBE fermentations (see, for example, Jones D. T., Woods D. R., 1986, Acetone-Butanol Fermentation Revisited. Microbiol. Rew., 50 (4), 484-524, or Table 16.6 Lopez-contreras A. et al chapter book 16, Bioalcohol Production: Biochemical Conversion of Lignocellulosic Biomass, 2010).

Studies have also taken place into processes operating continuously, first of all with cells in suspension in a homogeneous reactor. Improvements to the continuous processes have then been proposed, by increasing the retention of the microbial biomass in the bioreactor, especially by using cells immobilized on a substrate, and/or by using cell recycling with retention by means of filtering membranes (Vieira et al. 2019 Acetone-free biobutanol production: past and recent advances in the Isopropanol-Butanol-Ethanol (IBE) fermentation Biores. Technol., 287; 121425).

One of the barriers encountered in the development of fermentation processes is the step of recovering products which are highly diluted in the fermentation must. This parameter critically affects the economic cost of these types of process. In order to render this fermentative production process economically viable on the large scale, a first goal is to optimize the fermentation performance by maximizing the final titer arc and also the volume productivity in the bioreactor where the fermentation is carried out. Once the fermentation conditions have been optimized, for a given concentration of the molecules of interest in water, however, it is important economically to seek to improve the energy consumption associated with the phase of extracting the molecules of interest from the fermentation must.

A number of techniques exist for performing this extraction, with the most conventional one utilizing one or more distillation columns in series; however, other techniques, involving stripping the must with a gaseous stream, have also been explored, for example in patent WO2018/001628.

The invention is focused on extraction by distillation(s). It therefore aims to improve this extraction. For a given concentration of the fermentation must, the invention seeks more particularly to reduce the energy consumption and/or the capital investment in equipment required for this extraction.

SUMMARY OF THE INVENTION

A first subject of the invention is a process for extracting alcohols from an initial mixture comprising alcohols, including at least isopropanol and butanol, and optionally ethanol and/or acetone, in aqueous phase, said process comprising a series of separating operations, including:
  a distillative separation performed by at least one distillation column referred to as isopropanol-butanol column, intended for separating said initial mixture or a mixture deriving from said initial mixture into a water-isopropanol azeotrope stream at the top and into a water-butanol azeotrope stream at the bottom,
  a distillative separation intended for separating the water-butanol azeotrope stream into water and butanol, performed by a hetero-azeotropic distillation system comprising at least one water-recovery column referred to as water column, and at least one butanol-recovering column referred to as butanol column.

According to the invention, a heat transfer is performed from the water-isopropanol azeotrope stream entering the condenser of the isopropanol-butanol distillation column, to the stream entering the reboiler of the butanol column.

In the sense of the invention, "a mixture deriving from said initial mixture" refers to a mixture which originates from the initial mixture, especially after at least one distillative separation treatment.

The condenser of the isopropanol-butanol distillation column and the reboiler of the butanol column may advantageously be incorporated in the same (and single) apparatus.

The extraction according to the invention therefore comprises a succession of distillations, with each distillation column used requiring an energy-consuming supply of heat. It is known that columns are generally equipped with a bottom reboiler, which will be heated, generally by external steam, to raise the temperature of the liquid obtained from the bottom of the column to the required temperature and partly evaporate it, and so to generate a gas circulation ("vapor traffic") in the column, and with a top condenser for bringing the temperature of the top effluent back down and returning it to liquid phase, and thereby generating the liquid traffic in the column. In the case of a succession of columns, as in the present case, the choice of the invention has been to integrate two distillation columns thermally, by choosing columns which were appropriate for doing so, namely:
  firstly, the isopropanol-butanol column whose isopropanol-comprising top effluent may have the temperature sufficient for transferring heat, even if the working conditions of its operation have to be modified in order to attain this temperature;

secondly, the butanol column, which is in need of provision of heat sufficient to raise the feedstock to a temperature appropriate for distillation, even if, again, it must be adjusted in order to allow this thermal transfer, given that a thermal transfer is technically envisageable if only the temperature difference to be attained between the "hot" effluent on the one and the "cold" feedstock on the other hand is at least 5° C. and preferably at least 10° C.

Moreover, this thermal transfer has proven highly effective in reducing the energy consumption of the process as a whole, since the reboiler of the butanol column is heated at least partially, or even entirely, by the heat of condensation from the isopropanol-butanol column: it is possible to reduce or even omit the consumption of steam hitherto required for heating the reboiler of the butanol column. From an apparatus standpoint, the gain is also significant, since it is possible to reduce the size of, or even omit, the oven-type heating means required for producing the steam needed for heating the reboiler.

Preferably, the isopropanol-butanol distillation column is equipped at the top with a condenser, the butanol column is equipped with a reboiler, and the heat transfer is performed by a heat exchanger common to the two columns, incorporating said condenser and said reboiler, this being particularly effective and economical in terms of apparatus.

As indicated earlier on above, the thermal integration proposed by the invention may entail modifying the operation/working conditions (temperature, pressure) of the isopropanol-butanol distillation column, so that the water-isopropanol effluent has a sufficient temperature at the column exit to be able to carry out the transfer.

It is therefore possible to modify, especially increase, the operating pressure of the column. Advantageously, the pressure of the isopropanol-butanol distillation column may be regulated to a value of at least 3 bar absolute, especially at least 4 bar absolute, preferably of at most 10 bar absolute, especially of at most 7 bar absolute, especially between 4.5 and 6.5 bar absolute.

The isopropanol-butanol distillation column and the butanol column are preferably operated at temperatures selected in such a way that the top water-isopropanol azeotrope stream from the isopropanol-butanol distillation column (the "top" stream from this column corresponds to the stream entering the condenser of said column) is at a temperature T1 at least 8° C., especially at least 10° C., greater than the temperature T2 of the stream exiting the bottom of the butanol column.

Preferably, therefore, the isopropanol-butanol distillation column and the butanol column are operated at temperatures selected in such a way that the top water-isopropanol azeotrope stream from the isopropanol-butanol distillation column is at a temperature T1 of at least 120° C., especially of at most 140° C.

The operation of the isopropanol-butanol distillation column may be regulated for maintaining a two-phase liquid/gas mixture in the column, especially by imposing the abovementioned temperature/pressure conditions, such as a temperature of the isopropanol-water stream leaving at the column top of at least 120° C. and/or a pressure in the column of at least 3 bar absolute.

It has indeed been realized that modifying the working conditions of this column (operating more typically at lower pressure, especially at atmospheric pressure, and at lower temperature) makes it possible at the same time to obtain an advantage other than a drop in energy costs: at higher pressure/temperature, the column, which tends to operate in a three-phase liquid/liquid/gas medium, passes to just a two-phase liquid/gas medium, with the separation zone disappearing, hence allowing the column to be operated with typical/conventional internals/packings and not with specific trays adapted to the three-phase operation of the columns, and hence with reduced investment in apparatus and with easier control of the column.

It should be emphasized that the additional energy cost, where appropriate, arising from any increase in pressure/temperature in the isopropanol-butanol column remains much lower than the energy gain obtained for the butanol column, so making the invention highly attractive. It should be also emphasized that this increase in pressure/temperature in the isopropanol-butanol column, which remains controlled, has no adverse effect at all on the quality, the efficacy or the operability of the distillation performed in the isopropanol-butanol column in question.

The mixture for treatment according to the invention may also contain another alcohol, especially ethanol, generally in a minority amount relative to the amount of isopropanol and butanol.

As an example, the initial mixture for treatment may correspond to a fermentation must in aqueous phase comprising two majority compounds, mainly isopropanol I and butanol B, and minority compounds, especially two minority compounds such as acetone A and ethanol E, the characteristics of which are as follows:

total concentration of isopropanol I and butanol B: 8 to 30 g/L mass ratio I/B (majority products, isopropanol/butanol): 0.25-0.5/0.75-0.5 total concentration of minority products if present in the must (for example, acetone A and ethanol E): 0.1 g/l to 2 g/l.

In the scenario in which the initial mixture also comprises ethanol, the distillative separation performed by at least the isopropanol-butanol distillation column is intended for separating said mixture or a mixture deriving from said initial mixture into a water-isopropanol-ethanol azeotrope stream a the top and into a water-butanol azeotrope stream at the bottom. The thermal transfer according to the invention in case heat that utilizes the of condensation of the water-isopropanol-ethanol mixture.

According to one preferred embodiment, the thermal transfer to the stream entering the reboiler of the butanol column provides the entirety of the heat required for the operation of said column. In this scenario, it is therefore possible to omit the oven generating steam for heating the reboiler of the butanol column.

According to another embodiment, the thermal transfer to the stream entering the reboiler of the butanol column provides a portion of the heat required to the stream entering the butanol column for the operation of said column, the heat complement being supplied by another heat source, especially by an external steam source. In this scenario, therefore, another provision of heat is needed, either available elsewhere in the facility or by means of an oven generating steam, but then smaller in capacity, with lower energy consumption than without the thermal transfer according to the invention.

According to another embodiment, the thermal transfer to the stream entering the butanol column provides more heat than that required to the stream entering the reboiler of the butanol column for the operation of said column, and in that case a cooler is added for evacuating the excess heat. A cooler refers to any known technical means, of condenser(s) type, for example.

A process example according to the invention comprises the following series of operations for separating the mixture comprising alcohols, including at least isopropanol and butanol, and optionally ethanol, and also acetone, in aqueous phase:
  (a) a separation of said mixture, by distillation performed in a beer column and intended for removing at least a portion of the water from the aqueous phase, to give a concentrated mixture,
  (b) a separation of the concentrated mixture obtained from step (a), by distillation performed in a column referred to as acetone column, and intended for separating the acetone from said concentrated mixture, to give an acetone-depleted concentrated mixture,
  (c) a distillative separation performed by at least one column referred to as isopropanol-butanol distillation column and intended for separating the acetone-depleted concentrated mixture obtained in step (b) into a water-isopropanol or water-isopropanol-ethanol azeotrope stream at the top and into a water-butanol azeotrope stream at the bottom,
  (d) a distillative separation intended for separating the water-butanol azeotrope stream obtained in step (c) into water and butanol, performed by a hetero-azeotropic distillation system comprising at least one water-recovery column referred to as water column, and at least one butanol-recovering column referred to as butanol column.

The initial mixture comprising alcohols, including at least isopropanol and butanol, and optionally ethanol and/or acetone, in aqueous phase is advantageously a must obtained by fermentation of sugary liquors, especially derived from lignocellulosic biomass, under the action of microorganisms, especially obtained from a solvent-producing strain, preferably selected from at least one of the following microorganisms: bacteria, especially of the genus *Clostridium* (such as *C. tyrobutyricum* or *C. cellulovorans*), *Escherichia coli*, yeasts, especially of *Saccharomyces cerevisiae* type. These microorganisms may naturally be the native microorganisms, or may derive from them by genetic modification according to known techniques.

A particular feature of this must, indeed, is its high level of dilution with water, so necessitating these various separations, and especially a concentration step such as step (a) referred to earlier on above.

The initial mixture treated according to the invention may therefore have a concentration of organic compounds of 2 to 40 grams/liter, especially of 5 to 35 g/liter or of 8 to 30 grams/liter, typical of the concentrations encountered in fermentation musts. Organic compounds refer to the molecules of interest that the invention is seeking to separate and exploit economically, especially from the class of the alcohols and/or the solvents.

According to one embodiment of the invention, the initial mixture (1) originates only from one source, only from one production process starting from a single feedstock; for example, it is s a fermentation must obtained from a single fermentation with a single type of microorganism, the must, as a result of the selected process, comprising directly the mixture of organic compounds, alcohols, that the invention is seeking to separate.

According to another embodiment, the initial mixture according to the invention may combine two or more mixtures of different compositions, each comprising one or more alcohols in aqueous phase. Such combination may involve mixing, especially, two or more musts obtained by fermentation of sugary liquors with different microorganisms, each then having its own must composition. The mixture of these different streams, of these different musts, for example, may alternatively be carried out prior to any separation treatment by virtue of the invention, or in a dedicated premixing section, or else may be carried out during a separating step in the course of the process according to the invention: the streams/musts different may, for example, be injected jointly into a separating device, for example into the first distillation column of the facility according to the invention (the beer column, for example, as described later on below), with mixing then taking place directly in the device in question, without premixing.

The following may therefore be envisaged: —on the one hand, the production of a first must in the form of a first mixture comprising isopropanol by fermentation, and—on the other hand, production of a second must in the form of a second mixture comprising butanol by another fermentation, and the unification of the two musts so that they are treated jointly according to the invention (by being mixed upstream of the facility or in the facility implementing the invention, the mixing being carried out de facto during their treatment by the isopropanol-butanol column). Each of the two musts may comprise different impurities, or other molecules of interest (ethanol, etc.).

The separation of two or more different musts is therefore ultimately pooled by a single facility, a single process.

To produce a first must comprising isopropanol in particular, therefore, reference may be made to the article "Employing *Escherichia coli* for C2-C6 Bioalcohol Production", L. Liang et al., Front. Bioeng. Biotechnol., 03.07.2020.

And, for producing a second must comprising butanol in particular, reference may be made to the article "Genetic engineering of non-native hosts for 1-butanol production and its challenges: a review", S. Nawab et al., Microb Cell Fact, 27.03.2020.

A further subject of the invention is any facility for extracting alcohols that implements the process described above.

A further subject of the invention is a facility for extracting alcohols from an initial mixture comprising alcohols, including at least isopropanol and butanol, and optionally ethanol and/or acetone, in aqueous phase, said facility comprising a series of separating sections, including:
  a section for distillative separation, performed by at least one distillation column referred to as isopropanol-butanol column and equipped with a condenser, and intended for separating, at the top, said initial mixture or a mixture deriving from said initial mixture into a water-isopropanol or water-isopropanol-ethanol azeotrope stream and into a water-butanol azeotrope stream at the bottom,
  a section for distillative separation intended for separating the water-butanol azeotrope stream into water and butanol, performed by a hetero-azeotropic distillation system comprising at least one water-recovering column referred to as water column and at least one butanol-recovering column referred to as butanol column and equipped with a reboiler, such that it provides a thermal transfer from the top water-isopropanol or water-isopropanol-ethanol azeotrope stream from the isopropanol-butanol distillation column, entering the condenser, to the stream entering the reboiler of the butanol column.

The facility preferably comprises a heat exchanger common to the isopropanol-butanol distillation column and to the butanol column and assuring a thermal transfer from the water-isopropanol or water-isopropanol-ethanol azeotrope stream entering the condenser of the isopropanol-butanol distillation column to the stream entering the reboiler of the butanol column, this common exchanger incorporating said condenser and said reboiler.

The facility may comprise the following series of sections for separating the initial mixture comprising alcohols, including at least isopropanol and butanol, and optionally ethanol, and also acetone, in aqueous phase:

(a) a section for separating said mixture, by distillation comprising at least one beer column and intended for removing at least a portion of the water from the aqueous phase, to give a concentrated mixture, (b) a section for separating the concentrated mixture of step (a), by distillation comprising at least one column referred to as acetone column, and intended for separating the acetone from said concentrated mixture, to give an acetone-depleted concentrated mixture, (c) a section for distillative separation comprising at least one distillation column referred to as isopropanol-butanol column and intended for separating the acetone-depleted concentrated mixture obtained in step (b) into a water-isopropanol or water-isopropanol-ethanol azeotrope stream at the top and into a water-butanol azeotrope stream at the bottom, (d) a section for distillative separation intended for separating the water-butanol azeotrope stream obtained in step (c) into water and butanol, comprising at least one hetero-azeotropic distillation system comprising at least one water-recovery column referred to as water column, and at least one butanol-recovery column referred to as butanol column.

The facility according to the invention may also comprise an additional condenser at the top of the isopropanol-butanol column for evacuating the excess heat from top the water-isopropanol or water-isopropanol-ethanol azeotrope stream, if the amount of heat available in the azeotrope stream exceeds the amount of heat required for the stream entering the reboiler of the butanol column.

The invention will be described in more detail below, by means of nonlimiting examples and of the following figures:

LIST OF FIGURES

Figure 1:
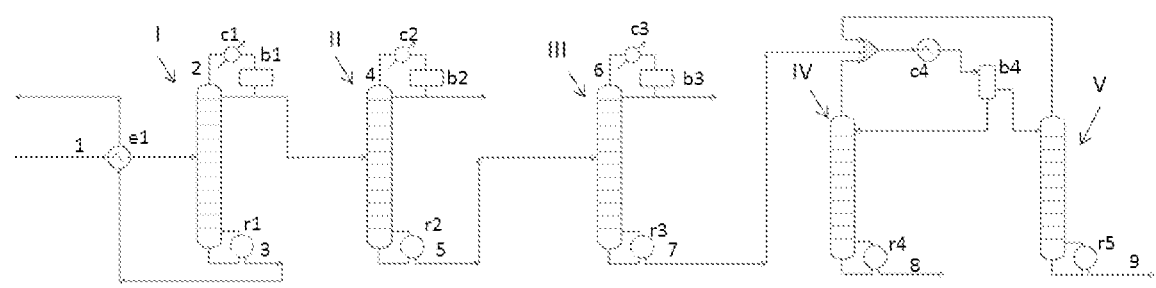
FIG. 1 represents an example of a facility for separating molecules of interest in aqueous solution, from the prior art.

The references which are identical from one figure to the other represent the same streams, devices and heat exchanges.

These two figures are highly schematic: they are flow diagrams, which are not to scale. The facilities are represented in simplified form to make reading easier, especially in order to comprehend the devices/streams which the invention employs, without representing all of the devices, in the form of ovens, exchangers, coolers/compressors, column reboilers, column condensers, etc. which are effectively provided in an industrial facility of this type and are known to the skilled person.

In all of the figures:

the numeric references denote fluid streams; the references in the form of Roman numerals denote the distillation columns, the references with letters the apparatuses;

for clarity, the "separating sections" are represented with a single column in the form of a distillation column. However, it is clear that the separating sections may contain/do contain a plurality of columns, mounted in series and/or in parallel, and that they may contain other separating devices in order to fulfil the role of at least one of the distillation columns, for example one or more liquid/gas separators in the form of tanks, etc.

DESCRIPTION OF EMBODIMENTS

The objective of the invention, in the following, nonlimiting example, is to recover the majority products, namely isopropanol on the one hand and n-butanol on the other, from an aqueous solution which also contains two other, minority components, namely acetone, considered here to be an impurity for removal, and ethanol, which is selected here for retention with the isopropanol.

The composition of the initial must (entering the beer column), as indicated earlier on above, is as follows:

total concentration of isopropanol I and butanol B: 8 to 30 g/L mass ratio I/B (majority products, isopropanol/butanol): between 0.25-0.5/0.75-0.5 total concentration of minority products, acetone a and ethanol e: 0.1 to 2 g/l.

The fermentation must from which the invention starts, by way of nonlimiting example, has the following composition and following features:

concentration of isopropanol I, butanol B, ethanol e and acetone a in water: 19.6 g/l weight ratio I/B/e+a=40.8/56.1/3.1 concentration of acetone a approximately double that of ethanol e.

This aqueous solution is a fermentation must obtained from a liquor composed of C5 and/or C6 sugars and fermented under the action of microorganisms derived from a *Clostridium* genus strain, in a known way, for example according to batch or continuous processes set out in the preamble. For further details of the fermentation process itself, reference may be made to the scientific publication cited for the batch process.

The composition of the stream entering the isopropanol-butanol column is especially as follows:

water: 35 to 45 weight % the remainder consisting of IBea the mass ratio r I/B (majority products, isopropanol/butanol): 0.25-0.5/0.75-0.5 concentration of acetone a: 0.1 to 1 g/l concentration of ethanol e: 2 to 10 g/l There are two possible uses for the isopropanol obtained:

it may be converted into propylene. Indeed, the hydrated isopropanol product obtained (with ethanol as minority product) with the process and facility according to the invention is a raw material suitable for conversion into propylene, as it leads to the production of a hydrated isopropanol fraction (with a little ethanol), since the isopropanol exhibits an azeotrope with water that is impossible to entirely separate solely by distillation.

it may also be used as a solvent, following removal of the water. In that case, an additional dehydration process must be considered in order to remove the water from the isopropanol/water azeotrope. Such processes include distillation with third substances (benzene, cyclohexane, etc.), pressure swing distillation (PSD), which is a term denoting distillation at two different pressures, temperature swing adsorption (TSA), which is a term denoting adsorption modulated by temperature, or pressure swing adsorption (PSA), which is a term denoting adsorption modulated by pressure, or pervaporation.

The butanol obtained (n-butanol in the present case), for its part, is produced in quasi-pure form in the process and the facility according to the invention. "Quasi-pure" refers to a butanol content of at least 98% by weight, especially of at least 98.5% or 99% in the liquid phase in question (or an impurities content of at most 2%, especially of at most 1.5% or 2% by weight).

It is possible, in the present text, for conciseness, to denote the mixture of isopropanol, butanol, ethanol and acetone in water by the term "IBea" mixture or simply by the term "IBea".

EXAMPLES

Example 1 (Comparative)

This example corresponds to the implementation of the facility according to FIG. 1.

The separation facility represented in FIG. 1 will be described "upstream" to "downstream", understanding these terms according to the overall flow direction of the fermentation must and of the extracted products through the facility.

The must 1 arrives from the fermentation section (not represented) with a concentration of IBea mixture of approximately 8 to 30 g/L and a temperature of between 34 and 37° C.

The first column I, usually called a beer column, preconcentrates the must 1 to approximately 60 weight % of IBea, emerging at the top of the column in the form of a stream 2 of concentrated IBea mixture, and removes approximately 97% to 99% of the incoming water at the bottom of the column. This water 3 at the bottom of the column I contains from 50 to 1000 ppm by weight of IBea and is called "Vinasse". Conventionally, this column I operates substantially at atmospheric pressure, and may also be operated at a maximum of 3 bar absolute. It has between 10 and 20 theoretical plates. It represents approximately 70% to 90% of the steam consumption of the overall separation process (this term refers to the process implemented in a facility as represented in FIG. 1). Depending on its pressure, the column I operates in a temperature range of approximately 100 to 140° C. (apart from condenser). It is possible to place a feedstock/effluent exchanger on this column I in order to preheat the feedstock (the must 1). This feedstock, initially at 34-37° ° C., returns to the column I, after being passed via the feedstock/effluent exchanger e1, at a temperature of between 70 and 85° C.

The role of the second column II, called the acetone column, is to remove the acetone, which is considered here to be an impurity. Conventionally, the column operates substantially at atmospheric pressure, and may also be operated at a maximum of 3 bar absolute. It comprises between 30 and 50 theoretical plates. It represents approximately 2% to 6% of the steam consumption of the overall separation process. The stream 2 enters the column II. Leaving the column are the acetone stream 4 at the top and the acetone-depleted stream 5 at the bottom.

The third column III, called the isopropanol-butanol column, produces at the top the isopropanol/water azeotrope, being the stream 6, which also comprises the small amount of ethanol entering as a minority compound with the must. The composition of this azeotrope is between 11 and 15 weight % of water. At the bottom of the column, a stream is obtained which has a composition close to that of the water/n-butanol azeotrope, i.e., a composition of approximately 50%/50% (weight), this being the stream 7. Here, this column III operates at atmospheric pressure, and the column has a pressure at the top of 1.5 bar absolute. It comprises between 30 and 70 theoretical plates; in this example, there are 50. Under these pressure conditions, a three-phase vapor/liquid/liquid zone is observed between plates 27 and 50, beginning the numbering of the plates at the condenser c3, with plates specific to the three-phase operating mode of the column. This column III represents approximately 7% to 15% of the steam consumption of the overall separation process.

The last two columns, IV and V, are coupled: they constitute a hetero-azeotropic distillation system, the principle of which is known, applied to the water/n-butanol binary system. At the bottom of the water column IV, water (stream 8) contained in the hetero-azeotrope is obtained, and at the bottom of the butanol column V, n-butanol (stream 9) is obtained with a purity which may range from 98 to 99.5 weight %. The two columns operate substantially at atmospheric pressure, and may go up to 2 bar absolute. The two columns IV and V have between 7 and 15 theoretical plates. The water column IV represents 1% to 3% of the steam consumption of the overall separation process, and the butanol column V represents 4% to 8% of the overall separation process.

All of the columns I to V are equipped, in a manner known for distillation columns,
 with a condenser c1, c2, c3, c4 at the column top, the last condenser c4 being common to the columns IV and V,
 and with a reboiler r1, r2, r3, r4, r5 at the bottom of the column, for heating the bottom stream of the column. In a known manner, these reboilers may be selected from the following reboilers: vertical thermosiphon reboilers, kettle-type reboilers, oven reboilers, or else "once-through" reboilers,
 and optionally with a reflux tank b1, b2, b3, b4 downstream of the condensers c1 to c4.

The steam consumption of the overall separation process as described varies between 12 and 50 MJ of steam/kg of IBea. It depends on the IBea concentration of the initial feedstock 1 (that is, of the must recovered after fermentation), and also on various design choices for the facility (working conditions of column operation, column design in terms of number of plates, positioning of feeds, etc.).

In terms of energy consumption of the isopropanol column III and butanol column V:
 the condenser c3 of the isopropanol column III is required to evacuate 1.43 MJ/kg IBea of available heat at a temperature of the order of 80° C.,
 the reboiler r3 of this same column III consumes 1.48 MJ/kg IBea of heat in the form of reboiling steam, the butanol column V consumes 0.9 MJ/kg IBea of heat in the form of reboiling steam (reboiler r5). This heat is required at a thermal level of approximately 120° C. at the operating pressure under consideration.

Example 2 (According to the Invention)

Figure 2:
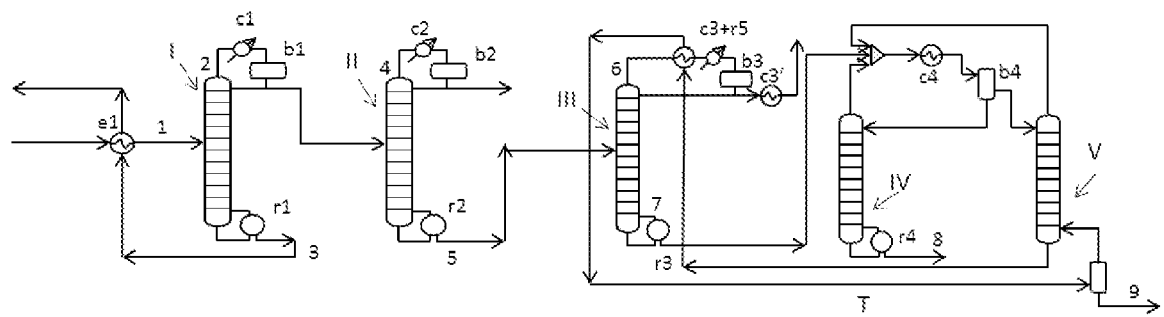
FIG. 2 represents the facility of FIG. 1, modified according to a nonlimiting embodiment of the invention.

This example corresponds to the implementation of the facility according to FIG. 2, which modifies and improves the facility of FIG. 1. All other things being equal, the only features detailed/specified are those which differ from the facility scheme of FIG. 1.

According to this example 2, a thermal transfer is added from the isopropanol-butanol column III to the butanol column V. To accomplish this, the pressure of the column III is increased: rather than operating at atmospheric pressure, a choice is made to operate the column under pressure, between 4 and 7 bar absolute, and more specifically, here, at around 5.5 bar absolute (measured at the top of the column). This increase in pressure leads to an increase in the operating temperatures of the column III. Thus the temperature at the top of the column increases to at least 120° C., especially up to 125° ° C. to 130° ° C., whereas with the standard operation at close to atmospheric pressure, according to example 1, the same temperature is only of the order of 80° C. At the top of the column, it is necessary to evacuate the heat energy, and, with this increase in temperature, the amount of heat energy to be evacuated from the top effluent in the condenser c3 of the column III is close to, or even a little greater than, the amount of heat energy to be supplied at the reboiler r5 of the butanol column V, which operates at around 120° C. at atmospheric pressure.

By increasing the temperature at the top of the column III, the heat evacuated at the condenser c3 of this column III can be transferred to the reboiler r5 of the butanol column, which operates at approximately 120° C. at a pressure close to atmospheric, via a new thermal connection T. Consequently only one exchanger is needed, common to the two columns, making up both the condenser c3 of the column III and the reboiler r5 of the column V, which can be assembled into a single apparatus c3+r5. Accordingly, two apparatuses (condenser of the isopropanol-butanol column III and reboiler of the butanol column V) are replaced with a single heat exchanger, and it is possible to omit the steam production means associated with the reboiler r5 of the column 5.

Where the amount of heat to be evacuated at the column III is not strictly equal to the amount of heat to be supplied to the column V, there are a number of options:
- if the amount is greater, an additional condenser c3' (for example, a cooler of the type referred to as a "trim cooler") is added at the top of the column III, which will be smaller than the initial condenser c3 at the top of the column, as it is required to evacuate less heat than the condenser c3 of example 1. Example 2 and FIG. 2 represent this scenario. The entirety of the top stream 6 from III enters the common exchanger c3+r5, incorporating the condenser c3 of the column III and the reboiler r5 of the column V. The hot effluent emerging from common this exchanger enters the additional condenser c3'. At the exit from this condenser c3', the stream is divided into 2: one portion leaves again in reflux in the column III; the remaining portion, the distillate, emerges from the process, being a product.
- if the amount is less, it is necessary to provide a steam top-up at the reboiler r5 of the column V, and so to use a heating means (not represented in the figure) to produce steam; however, this top-up remains significantly less than the amount of steam needed without this thermal transfer between the two columns; it will therefore be possible to use a much smaller heating means (oven type), with a heating capacity much lower than in the case of example 1.

Surprisingly, it has emerged that increasing the pressure of the column III provides another advantage: at atmospheric pressure, there is a liquid/liquid separation zone in this column, owing to the presence of the ternary isopropanol/n-butanol/water system. This type of three-phase liquid/liquid/vapor zone generally requires the installation of specific column internals, which are more expensive and more complicated to implement than conventional distillation trays. With the increased pressure according to the invention, the three-phase separation zone disappears from the column, and column the can therefore be operated with conventional internals such as valve trays or perforated trays, bulk or structured packings, thereby making it possible to reduce the facility investment further.

In terms of energy consumption of the isopropanol-butanol column III and butanol column V:
- the condenser c3 of this third column III is required to evacuate 1.44 MJ/kg IBea of heat, available at a temperature of 129.5° C.; this rise in temperature relative to example 1 is a result of the rise in operating pressure of the column.

The fifth, butanol column V requires a reboiling heat of 0.9 MJ/kg IBea in the form of steam, at a thermal level of 119.5° C. The thermal transfer between the condenser of the column III and the boiler of the column V has therefore become possible. Here, it will be necessary to evacuate 1.44−0.9=0.54 MJ/kg IBea at the level of the condenser c3 of the isopropanol-butanol column III (rather than the 1.43 MJ/kg IBea according to example 1): the heat to be evacuated is less than in the case of example 1 and the apparatus will be smaller. Lastly, the heat to be supplied to the reboiler r3 of the isopropanol column III is 1.71 MJ/kg rather than 1.48 MJ/kg, corresponding to a rise of 0.23 MJ/kg (owing to the rise in pressure).

Table 1 below summarizes the energy data for the columns III and V according to example 1 and example 2, and details the calculation of the resultant energy gains:

TABLE 1

|  | Example 1 (comparative) | Example 2 (invention) | Gain G1, G2 |
|---|---|---|---|
| Isopropanol/butanol column III | | | |
| Top pressure (bar abs.) | 1.5 | 5.5 | |
| Condenser c3 (MJ/kg IBea) | 1.43 | 1.44 | |
| Reboiler r3 (MJ/kg IBea) | 1.48 | 1.71 | |
| Butanol column V | | | |
| Top pressure (bar abs.) | 1.15 | 1.15 | |
| Reboiler r5 (MJ/kg IBea) | 0.9 | 0.9 | |
| Heat for evacuation (MJ/kg IBea) | 1.43 | 1.44 − 0.9 = 0.54 | G2 = 1.43 − 0.54 = 0.89 |
| Heat for provision (MJ/kg IBea) | 1.48 + 0.9 = 2.38 | 1.71 + 0.9 − 0.9 = 1.71 | G1 = 2.38 − 1.71 = 0.67 |

By comparing these data on the energy operation of the columns III and V, it is verified that with the invention, gains are achieved both:
- in terms of energy for evacuating the heat from the column III, with a gain G2 in the heat for evacuation of 0.89 MJ/kg IBea, corresponding to a decrease in cooling the energy consumption of (0.89/1.43×100=) 62%;
- and in terms of energy for supply to the column V, with a gain G1 on the heat for supply of 0.67 MJ/kg IBea, corresponding to a decrease in the heating energy consumption of (0.67/2.38×100=) 28%.

It is therefore evident that, overall, the thermal transfer between the two distillation columns according to the invention ultimately produces considerable energy gains relative to conventional use of these two columns, in terms both of cooling (spectacular decrease of more than half in consumption) and of heating (significant decrease of at least 20%), without entailing any significant extra cost in terms of apparatus. With the condenser c3 and the reboiler r5 having been incorporated in a single apparatus and with the heat for evacuation at the additional condenser c3' (the "trim cooler") being 62% lower, this additional condenser c3' of example 2 according to the invention is/can be markedly smaller than the condenser c3 of example 1. It should be noted that the addition of this additional condenser remains optional, according to the specific scenarios encountered, as is indicated earlier on above.

The invention claimed is:

1. A process for extracting alcohols from an initial mixture (1) comprising isopropanol and butanol, and optionally further comprising ethanol and/or acetone, in aqueous phase, said process comprising:
   performing a distillative separation in in at least one isopropanol-butanol distillation column (III) equipped with a top condenser (c3), wherein the initial mixture, or a mixture deriving from said initial mixture, is separated into a water-isopropanol azeotrope stream (6) at a top of the isopropanol-butanol distillation column (III) and a water-butanol azeotrope stream (7) at a bottom of the isopropanol-butanol distillation column (III), and wherein the water-isopropanol azeotrope stream (6) is cooled in top condenser (c3),
   performing a distillative separation for separating the water-butanol azeotrope stream (7) into water and butanol, in a hetero-azeotropic distillation system comprising at least one water column (IV) from which water is recovered, and at least one butanol column (V) from which butanol is recovered, the butanol column (V) being equipped with a reboiler (r5) in which a bottom stream removed from butanol column (V) is heated, and
   performing a heat transfer between the water-isopropanol azeotrope stream (6) entering the condenser (c3) of the isopropanol-butanol distillation column (III) and the bottom stream removed from the butanol column (V).

2. The process as claimed claim 1, wherein the heat transfer is performed by a heat exchanger (c3+r5) which incorporates said condenser (c3) and said reboiler (r5).

3. The process as claimed in claim 1, wherein operation of the isopropanol-butanol distillation column (III) is regulated for maintaining a two-phase liquid/gas mixture in the column.

4. The process as claimed in claim 1, wherein the pressure of the isopropanol-butanol distillation column (III) is operated at a pressure of at least 3 bar absolute.

5. The process as claimed in claim 1, wherein the isopropanol-butanol distillation column (III) and the butanol column (IV) are operated at temperatures selected such that the water-isopropanol azeotrope stream (6) from the isopropanol-butanol distillation column (III) is at a temperature T1 which is at least 8° C. greater than the temperature T2 of the bottom stream removed from of the butanol column (V).

6. The process as claimed in claim 1, wherein the isopropanol-butanol distillation column (III) and the butanol column (V) are operated at temperatures selected such that the water-isopropanol azeotrope stream (6) from the isopropanol-butanol distillation column (III) is at a temperature T1 of at least 120° C.

7. The process as claimed in claim 1, wherein the initial mixture (1) comprises ethanol, and the distillative separation performed in isopropanol-butanol distillation column (III) separates said initial mixture, or a mixture deriving from said initial mixture, into a water-isopropanol-ethanol azeotrope stream (6) at the top of isopropanol-butanol distillation column (III) and into a water-butanol azeotrope stream (7) at the bottom of isopropanol-butanol distillation column (III).

8. The process as claimed in claim 1, wherein the thermal transfer to the bottom stream removed from the butanol column (V) provides the entirety of the heat required for the operation of the butanol column (V).

9. The process as claimed in claim 1, wherein the thermal transfer to the bottom stream removed from the butanol column (V) provides a portion of the heat required for the operation of the butanol column (V), and the reminder of the heat required for the operation of the butanol column (V) is supplied by another heat source.

10. The process as claimed in claim 1, wherein the thermal transfer to the bottom stream removed from the butanol column (V) provides more heat than that required for the operation of the butanol column (V), and a cooler (c3') is provided for removing excess heat from the bottom stream of the butanol column (V).

11. The process as claimed in claim 1, further comprising:
   (a) separating the initial mixture, by distillation in a beer column (I) to remove at least a portion of water from the aqueous phase, to provide a concentrated mixture (2),
   (b) separating the concentrated mixture (2) obtained from step (a) by distillation in an acetone column (II) to at least partly separating acetone from said concentrated mixture (2) to give an acetone-depleted concentrated mixture (5), and
   wherein the acetone-depleted concentrated mixture (5) is the mixture that is subjected to distillative separation in the isopropanol-butanol distillation column (III) to obtain the water-isopropanol azeotrope stream (6) and the water-butanol azeotrope stream (7).

12. The process as claimed in claim 1, wherein the initial mixture (1) is a must obtained by fermentation of sugary liquors under the action of microorganisms.

13. The process as claimed in claim 1, wherein the initial mixture (1) combines two or more mixtures of different compositions, each comprising one or more alcohols in aqueous phase.

14. The process as claimed in claim 3, wherein the isopropanol-butanol distillation column (III) is operated at a temperature of at least 120° C. and/or operated at a pressure of at least 3 bar absolute.

15. The process as claimed in claim 1, wherein the isopropanol-butanol distillation column (III) is operated at a pressure of at least 3 bar absolute and at most 10 bar absolute.

16. The process as claimed in claim 1, wherein the isopropanol-butanol distillation column (III) is operated at a pressure of between 4.5 and 6.5 bar absolute.

17. The process as claimed in claim 1, wherein the isopropanol-butanol distillation column (III) and the butanol column (IV) are operated at temperatures selected in such a way that the water-isopropanol azeotrope stream (6) from the isopropanol-butanol distillation column (III) is at a temperature T1 which is at least 10° C. greater than the temperature T2 of the bottom stream removed from the butanol column (V).

18. The process as claimed in claim 1, wherein the isopropanol-butanol distillation column (III) and the butanol column (V) are operated at temperatures selected in such a way that the water-isopropanol azeotrope stream (6) from the isopropanol-butanol distillation column (III) is at a temperature T1 of at least 120° C. and at most 140° C.

19. The process as claimed in claim 3, wherein the isopropanol-butanol distillation column (III) is operated at a temperature of at least 120° C. and a pressure of at least 3 bar absolute.

20. The process as claimed in claim 1, wherein the isopropanol-butanol distillation column (III) is operated at a pressure of at least 4 bar absolute and at most 7 bar absolute.

21. The process as claimed in claim 1, wherein the initial mixture (1) is a must obtained by fermentation of sugary liquors derived from lignocellulosic biomass, under the action of microorganisms selected from at least one of the following microorganisms: bacteria of the genus *Clostridium, Escherichia coli*, and *Saccharomyces cerevisiae* type yeasts.

22. A facility for extracting alcohols from an initial mixture (1) comprising isopropanol and butanol, and optionally further comprising ethanol and/or acetone, in aqueous phase, said facility comprising:
 a first section for distillative separation performed by at least one isopropanol-butanol distillation column (III) which is equipped with a top condenser (c3), wherein the first section for distillative separation is capable of separating said initial mixture, or a mixture deriving from said initial mixture, into a water-isopropanol or water-isopropanol-ethanol azeotrope stream (6) at a top of isopropanol-butanol distillation column (III) and into a water-butanol azeotrope stream (7) at a bottom of isopropanol-butanol distillation column (III),
 a second section for distillative separation comprising at least one water column (8) for recovering water and at least one butanol column (9), the second section for distillative separation capable of separating the water-butanol azeotrope stream (7) into water and butanol by a hetero-azeotropic distillation wherein the butanol column (9) is equipped with a reboiler (r5) for heating a bottom stream removed from the butanol column (9), and
 a heat exchanger, which is common to the isopropanol-butanol distillation column (III) and to the butanol column (V), for providing a thermal transfer from the water-isopropanol or water-isopropanol-ethanol azeotrope stream (6) to the bottom stream of the butanol column (V), wherein said heat exchanger incorporates said condenser (c3) and said reboiler (r5), and
 optionally an additional condenser for removing excess heat from the water-isopropanol or water-isopropanol-ethanol azeotrope stream (6).

23. The facility as claimed in claim 22, further comprising:
 (a) a section for separating the initial mixture, by distillation comprising at least one beer column (I) for removing at least a portion of water from the aqueous phase, to give a concentrated mixture,
 (b) a section for separating the concentrated mixture by distillation comprising at least one acetone column (II) for separating acetone from said concentrated mixture, to give an acetone-depleted concentrated mixture, and
 means for introducing the acetone-depleted concentrated mixture into the at least one isopropanol-butanol column (III) of the first section for distillative separation.

\* \* \* \* \*